(12) United States Patent
Foodeei et al.

(10) Patent No.: US 6,445,696 B1
(45) Date of Patent: Sep. 3, 2002

(54) EFFICIENT VARIABLE RATE CODING OF VOICE OVER ASYNCHRONOUS TRANSFER MODE

(75) Inventors: Majid Foodeei, San Francisco; Anthony E. Raetz, Menlo Park, both of CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 0 days.

(21) Appl. No.: 09/513,667

(22) Filed: Feb. 25, 2000

(51) Int. Cl.[7] .............................. H04J 3/24; H04L 12/56
(52) U.S. Cl. ................... 370/356; 370/395.6; 370/465; 370/469; 370/471; 370/474
(58) Field of Search ................................ 370/231, 235, 370/352, 356, 389, 401, 465, 466, 468, 469, 470, 471, 474, 395.6, 395.64, 395.65; 704/500, 501; 709/230, 232, 238, 246, 247, 249

(56) References Cited

U.S. PATENT DOCUMENTS

| 5,132,966 A | 7/1992 | Hayano et al. ............... 370/79 |
| 5,406,560 A | 4/1995 | Kondo et al. |
| 5,418,781 A | 5/1995 | Kaufman et al. ............. 370/60 |
| 5,459,722 A | 10/1995 | Sherif |

(List continued on next page.)

Primary Examiner—Alpus H. Hsu
(74) Attorney, Agent, or Firm—Townsend and Townsend and Crew LLP

(57) ABSTRACT

The invention uses an ATM Adaptation Layer of type 2 (AAL2) standard mechanism to define efficient support for Variable Rate Coding (VRC). The VRC in this context typically refers to codecs, which adapt their rate to information content variations in speech and audio. Such VRC results in lower average rate than the constant rate codecs or use of constant rate codecs coupled with silence suppression (SS), currently deployed in voice over ATM schemes using AAL2. Possible ATM transport, trunking and access applications encompass both Circuit Emulation Services (CES) and Local Loop Emulation Services (LLES). A typical VRC profile encompasses options for all sub-rates within one or more VRC standard or proprietary variable rate codec. The output of a rate determination algorithm (RDA), commonly part of variable rate codec, is fed into present AAL2 interworking function (IWF). The IWF in AAL2, which normally supports SS or multiple rates (as opposed to voice content VRC), is extended to accommodate VRC and thereafter automatically furnishes AAL2 capabilities with extensions to VRC. As AAL2 standard capability is extended to VRC, all other advantages of AAL2 and Voice over ATM, including channel multiplexing, idle channel suppression, and alternative signaling methods, are maintained and leveraged. A simple mapping of frame number in a typical VRC speech codec into AAL2 sequence number is employed. This allows for easy use of available error concealment techniques based on frame error, already part of VRC codec standards such as Enhanced VRC (EVRC). When using tandem-free-operation (TFO) of VRC-ATM, higher end-to-end voice quality and bandwidth efficiency can be provided. More advanced capabilities can provide TFO VRC across access and transport networks involving ATM.

12 Claims, 3 Drawing Sheets

U.S. PATENT DOCUMENTS

| | | | | |
|---|---|---|---|---|
| 5,515,377 A | * | 5/1996 | Horne et al. | 370/94.1 |
| 5,526,353 A | | 6/1996 | Henley et al. | |
| 5,541,852 A | * | 7/1996 | Eyuboglu et al. | 364/514 C |
| 5,623,491 A | | 4/1997 | Skoog | |
| 5,633,861 A | | 5/1997 | Hanson et al. | 370/232 |
| 5,742,599 A | * | 4/1998 | Lin et al. | 370/395 |
| 5,768,271 A | | 6/1998 | Seid et al. | 370/389 |
| 5,802,051 A | | 9/1998 | Petersen et al. | |
| 5,805,588 A | | 9/1998 | Petersen | |
| 5,822,321 A | | 10/1998 | Petersen et al. | |
| 5,870,397 A | | 2/1999 | Chauffour et al. | |
| 5,873,058 A | | 2/1999 | Yajima et al. | |
| 5,878,045 A | | 3/1999 | Timbs | |
| 5,883,893 A | * | 3/1999 | Rumer et al. | 370/395 |
| 5,884,064 A | | 3/1999 | Rosenberg | 395/500 |
| 5,903,559 A | | 5/1999 | Acharya et al. | 370/355 |
| 5,930,265 A | * | 7/1999 | Duault et al. | 370/473 |
| 5,933,803 A | | 8/1999 | Ojala | |
| 5,936,965 A | | 8/1999 | Doshi et al. | |
| 5,936,967 A | | 8/1999 | Baldwin et al. | |
| 5,946,309 A | | 8/1999 | Westberg et al. | |
| 5,949,791 A | | 9/1999 | Byers et al. | |
| 5,990,945 A | | 11/1999 | Sinha et al. | |
| 5,991,268 A | | 11/1999 | Awdeh et al. | |
| 6,108,382 A | * | 8/2000 | Gringeri et al. | 375/240 |
| 6,118,763 A | * | 9/2000 | Trumbull | 370/231 |

* cited by examiner

US 6,445,696 B1

EFFICIENT VARIABLE RATE CODING OF VOICE OVER ASYNCHRONOUS TRANSFER MODE

BACKGROUND OF THE INVENTION

1. Field of the Invention

The present invention relates generally to the field of telecommunications and more specifically a new efficient variable rate coding (VRC) of voice over asynchronous transmission Mode (ATM) using enhancements to the utilization of ATM adaptation layer of type 2 (AAL2). Possible ATM transport, trunking and access applications encompass both Circuit Emulation Services (CES) and Local Loop Emulation Services (LLES).

2. Discussion of the Background Art

Speech compression or coding with many standardized techniques reduces the bandwidth utilization of voice transmission and storage. Silence suppression (SS) improves average compression rate and is layered over the conventional constant rate speech coders. SS popularity is evident by the recent ITU (International Telecom Union) standardization of 8 kb/s G.729 coding in combination with SS under G.729-D. Application of SS in combination with other standard compression techniques is brought to VoIP (Voice over Internet Protocol) and VTOA (Voice Telephony over ATM) products. IETF, ITU, and ATM Forum have had related standard activities. Most notably, ATM Forum standardized ATM Adaptation Layer of type 2 (AAL2) provides an accepted scheme for ATM system integration and inter-operation.

Silence suppression can, however, be considered the first step in VRC. Note that VRC as utilized here, and as exemplified later in this disclosure, refers to a specific variable voice coding (narrowband or wideband) whereby the rate adaptation is based mainly on variations in voice information content while maintaining certain subjectively weighted speech quality. SS, in a sense, is the trivial type of such VRC. This may be contrasted to variation in speech codec rate simply through switching the selected rate to an alternative rate. VRC can reduce average digital rate significantly through exploiting inherent variations in voice information content while maintaining required quality. However application of such VRC may not be readily possible in the context of all communication networks or systems. An application that has successfully utilized VRC is the CDMA (Code Division Multiple Access) wireless system. Due to CDMA distinct characteristics (in contrast to Time Division Multiple Access and other digital wireless systems), practical VRC's such as IS-733 QCELP (Qualcomm PureVoice codec a.k.a. QCELP) and IS-127 Enhanced Variable Rate Coder (EVRC) were introduced. QCELP is also used in several Internet applications most notably JFAX™, Apple®, QuickTime™, and Eudora®. With the success of CDMA technology, on the road to the third generation wireless systems (3G or IMT-2000), VRC will likely be the dominant speech compression scheme in future wireless systems. A sub-committee of TIA (3GPP2-SWG) has already initiated the standardization of next generation VRC under the title of Selectable Mode Vocoder (SMV). Other than one mode of SMV, which is reserved for backward compatibility with EVRC, other modes promise to provide very low average rate with quality target close to G.723.1 at 6.3 kb/s as well as slightly higher average rate but with higher quality (same as IS-733). To demonstrate examples of coding efficiency provided by VRC it is shown that for a typical speech pattern, average rate of 6.8 and 4.7 for IS-733 QCELP and EVRC are possible. Constant rate codecs provide equivalent quality at around 10 and 8 kb/s respectively. SMV promises to reduce these compression figures.

ATM and IP (Internet Protocol) technologies have provided networking infrastructure alternatives for the turn of century communication systems. The background and prior art related to the network and system issues of this invention are mainly found in recent standardization efforts in ATM forum and ATM activities in ITU-T, most notably, ATM adaptation Trunking using AAL2 for narrowband service. Other related documents are ITU-T documents I.363.2 (adaptation layer of type 2), I.366.2 (service specific convergence sublayer), as well as ATM Forum document AF-VTOA-0113.000 (ATM trunking using AAL2).

These standardizations fulfill the urgent market need for an efficient transport mechanism to carry voice, voice-band data, circuit mode data, frame mode data, and fax traffic. The voice transport supported includes compressed voice and non-compressed voice together with SS and encompasses CES. Other related prior art includes U.S. Pat. Nos. 5,606,552; 5,481,544; and 5,870,397. These references and the above ITU and ATM Forum standards disclose fundamental means to efficiently transport voice and other data (single and multi-channel) over ATM. The scope of this prior art is however limited to SS and does not encompass VRC voice over ATM using enhancements to utilization of AAL2. AF-VTOA subcommittee recently initiated extensions of such voice trunking and transport over ATM LANs to newly emerged application areas. These applications, referred to as LLES, entail integrated voice and data access over ATM networks with connections to customer premises based on Digital Subscriber Line (xDSL), Hybrid Fiber Coax (HFC), or fixed wireless technologies. With the exception of SS, AAL2 and these activities however have been limited to constant rate voice compression.

SUMMARY OF THE INVENTION

VRC support is not part of conventional voice telephony that almost without exception has used TDM, which uses fixed dedicated bandwidth or constant bit rate for compressed speech. Voice telephony applications over ATM using AAL2 (e.g. AF-VOTA-0113.000) exploit only SS, a more primitive type of VRC. The proposed scheme in this invention takes advantage of popularity of AAL2 and provides a low cost development roadmap to allow efficient VRC voice over ATM using novel extensions to the AAL2 utilization. The AF-VOTA-0113.000 application domain, CES trunking, can be extended to newly emerged LLES narrowband and broadband access and transport applications. PBX/CO-to-CO (PBX=Private Branch Exchange) (CO=Central Office), PBX-to-PBX, xDSL, and (fixed) wireless access of VRC access and transport ATM are among potential applications. As AAL2 standard capabilities and compatibility are utilized and maintained, the invention herein remains cost effective.

In its simplest form, the invention uses AAL2 standard mechanism to define support for VRC and hence has no incompatibility bearing on existing systems supporting AAL2. A typical VRC profile encompasses options for all sub-rates within one or more VRC standard or proprietary variable rate codec (e.g. EVRC IS-127). The individual sub-rate (e.g. full rate, half rate, or one eight rate in IS-127) encoded audio format resembles any audio algorithm format listed in AAL2. The output of rate determination algorithm (RDA), commonly part of variable rate codec, is fed into present AAL2 inter-working function (IWF). The IWF in AAL2, which normally supports SS or multiple rates (as opposed to voice content VRC), is extended to accommodate VRC and thereafter automatically furnishes AAL2 capabilities with extensions to VRC. These capabilities, outlined in AF-VOTA-0113.000, include Multiplexer and Demultiplexer function to combine individual (VRC or otherwise) channels, narrowband signaling (Channel associated signaling or CAS and Common Channel Signaling or CCS), idle channel suppression, AAL2 SSCP (System Services Control Point) and CPS (Common Part Sublayer) functions, VCC (Virtual Channel Connection) management, et cetera. A simple mapping of frame number in a typical VRC speech codec into AAL2 sequence number is proposed. This allows for easy use of available error concealment techniques based on frame error, already part of VRC codec standards such as EVRC.

When using tandem-free-operation (TFO) of VRC-ATM, higher end-to-end voice quality and bandwidth efficiency can be provided. More advanced capabilities of the invention can provide TFO VRC across access and transport networks involving ATM. More complex system and network interworking functions in such cases may or may not be cost effective and practical and benefit tradeoffs need to be considered.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF PREFERRED EMBODIMENTS OF THE INVENTION

The VRC Voice Over ATM Reference Model and Applications

Figure 1:
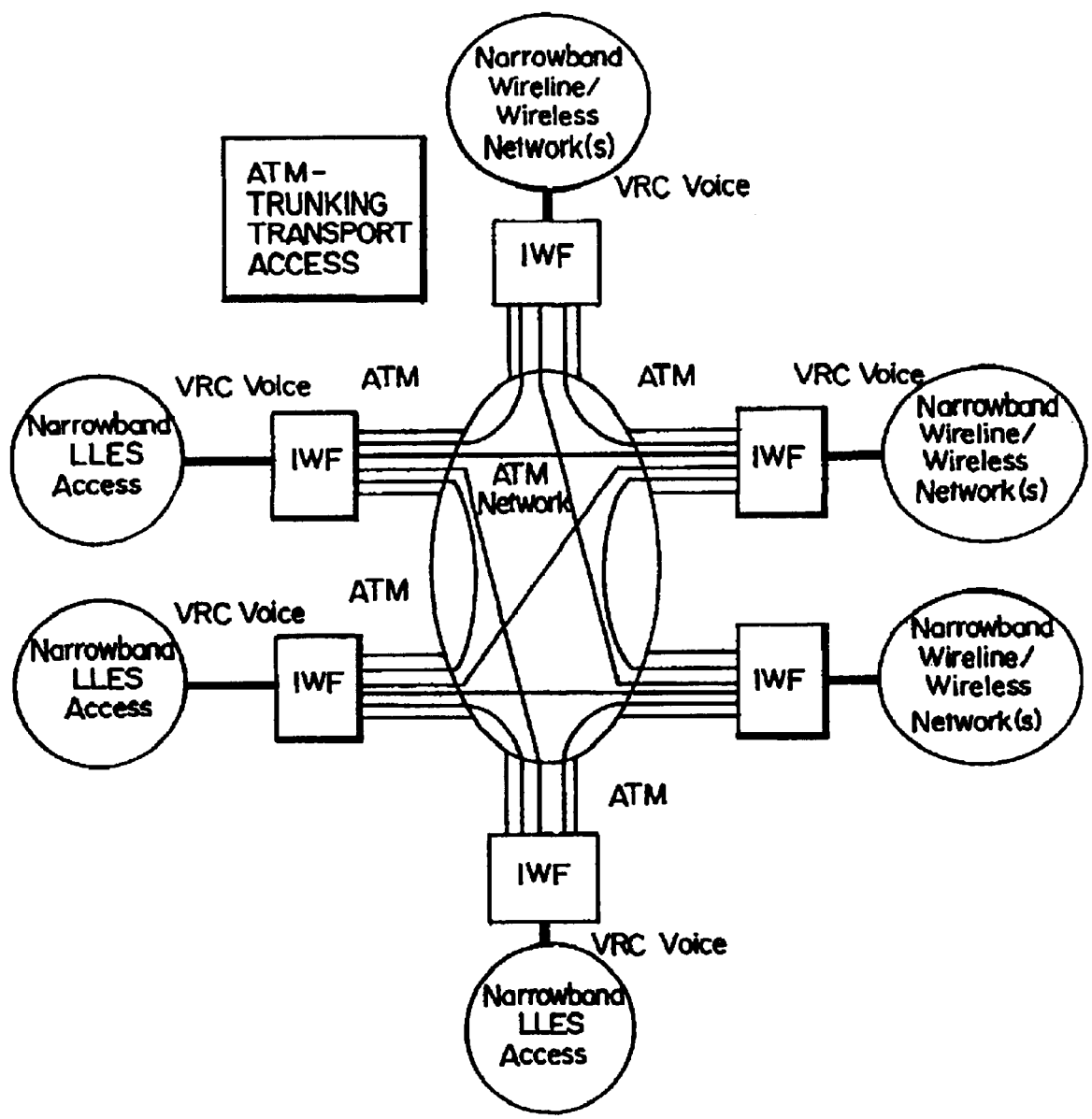
FIG. 1 is a block diagram of a reference model of the invention.

FIG. 1 depicts the reference model for the invention. The broad range of applications involving both transport/trunking and access has to support an IWF (Inter-Working Function) with narrowband and broadband facilities interworking with another IWF at far-end IWF. Note that the reference model here encompasses the AAL2 specification for CES and LLES, as well as wireless access and TFO. The focus here however is providing procedures to support easily implementable efficient VRC voice over ATM for LLES and CES/transport/trunking and access. The IWFs therefore are enhancements to AAL2 specification and LLES. As VRC is the speech codec of choice in the case of wireless (CDMA and third generation), wireless application can additionally be accommodated.

Figure 2:
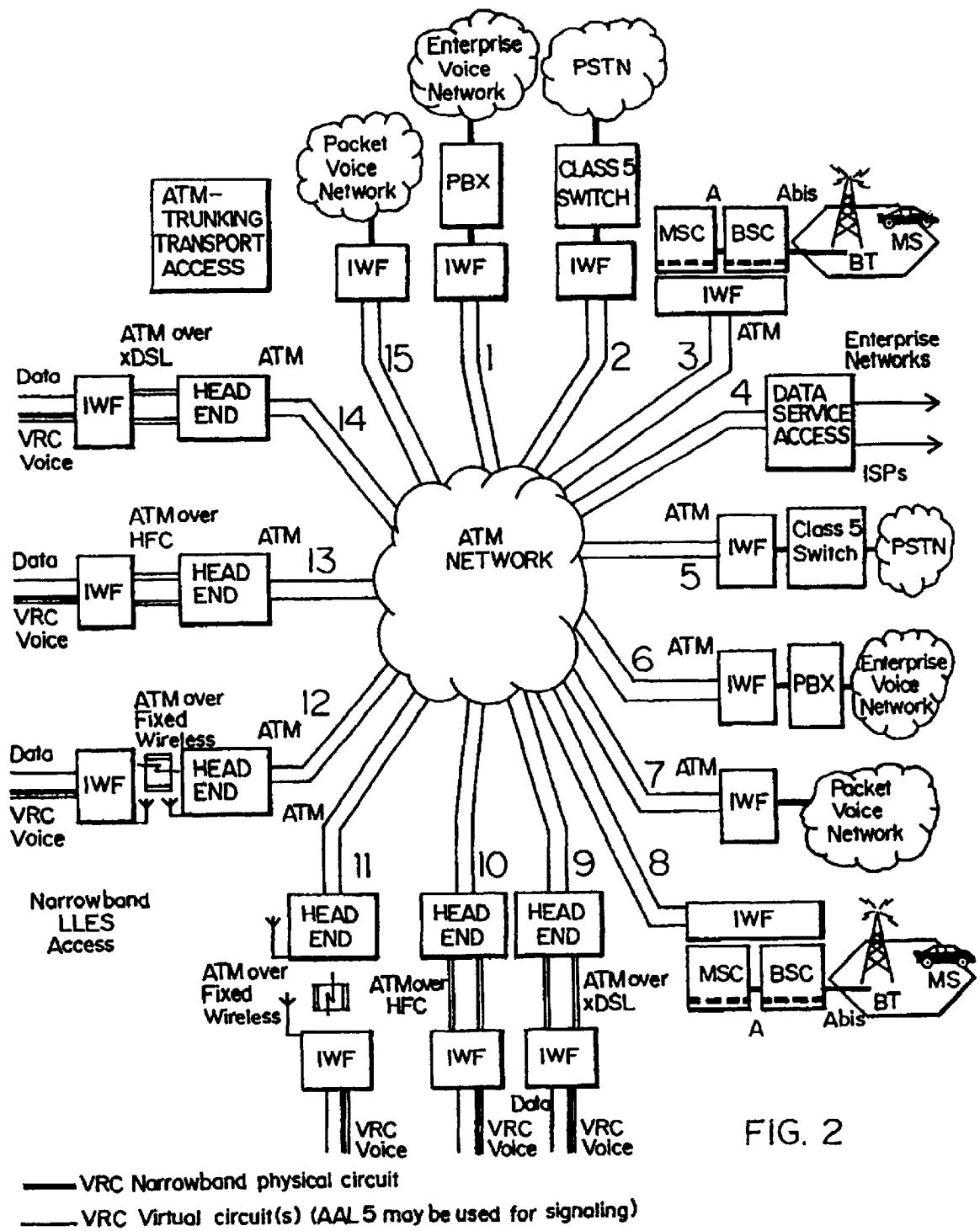
FIG. 2 is a graphical illustration of application examples of the invention.

FIG. 2 depicts most of the application examples for the inventive VRC voice over ATM. The first groups are trunking/transport applications:

VRC and enhanced AAL2 for access trunking to PSTN (Public Switched Telephone Network) where a PBX (enterprise network) can be connected to PSTN (switch is located at Central Office within PSTN). Branches numbered 2 and 5 in FIG. 2 depict this application.

PBX-to-PBX VRC voice over ATM is another example of trunking CES. Branches numbered 1 and 6 in FIG. 2 depict this application. Note that in most enterprise trunking applications, more than two PBX may be involved.

Packet voice networks interconnected using enhanced AAL2 IWF, providing VRC voice trunking. Branches numbered 15 and 7 in FIG. 2 depict this application.

The broadband access applications of LLESs (mostly under development or study) involve LLES customers' premises with AAL2 support and connected to a telephone at one end. Among the emerging LLES customer premise access types, included in FIG. 2 are ones such as xDSL, HFC, and fixed wireless. The far end of the connection is any of the various other telecommunication devices equipped with enhanced AAL2 and mentioned above, such as:

LLESs such as xDSL, HFC, and fixed-wireless, equipped with AAL2 and VRC speech codec with added IWF, providing enhanced AAL2 for VRC voice over ATM access at one end.

The far end equipped with interworking IWF at local digital switch in PSTN CO. Branches numbered 12–14 connecting to branches 2 or 5 in FIG. 2 depict these applications.

Next type of applications involve any of the LLES access types as in the above cases but at the far end has a PBX which forms part of an enterprise network. Branches numbered 1 and 6 in FIG. 2, once again connected to any of the branches 12–14, depict this application.

Another application involves any of the LLES access devices (branches 12–14) at one end but entails connection to a packet network which provides long distance telephony services (branch 7 or 15).

The ATM access network may act as trunking for VRC voice channel among any of LLES access devices. The channels will be established among LLES access devices.

The channel connections will preferably stay among LLES branches numbered 1–14 in FIG. 2, depicting these applications.

The wireless-to-wireless application and wireless to PSTN (as well as other) applications involves addition of enhanced AAL2, extending VRC voice where normally encoded VRC bit stream is passed through the decoder. We assume CDMA or third generation wireless involving VRC of speech.

Wireless-to-wireless TFO with VRC voice over ATM as transport/trunking method. The AAL2 support is overlaid with IWF allowing support of VRC voice over ATM. Branches numbered 3 and 8 in FIG. 2 depict this application.

Wireless-to-PSTN and wireless-to-other applications provide VRC wireless access into PSTSN or other equipment type as depicted by connection which involves branch 3 or 8 at one end and branch 2 or any other in FIG. 2 at the far end.

It should be noted that, in the case of wireless applications, IWF entails modifications to wireless rate supervision mechanism, involving both BSC (Base Station Controller) and MSC (Mobile Switching Center).

One assumption in the presented reference model and depicted application is support of AAL2. In most basic form, the specified IWFs in this invention provide new VRC profiles and profile identifiers which make VRC voice over ATM using such enhancements to AAL2 possible. Details of these profiles are provided below.

In some cases, the required IWF may additionally need more application specific modifications to device protocols and standards. In particular, as an example, VRC in CDMA wireless systems involves modifications to common use of IS-95 and IS-41 wireless standard for rate supervision. The details of such interworking functions are beyond the scope of this invention. These modifications can be layered over the basic IWF specification, specified hereinafter.

VRC Background

Figure 3:
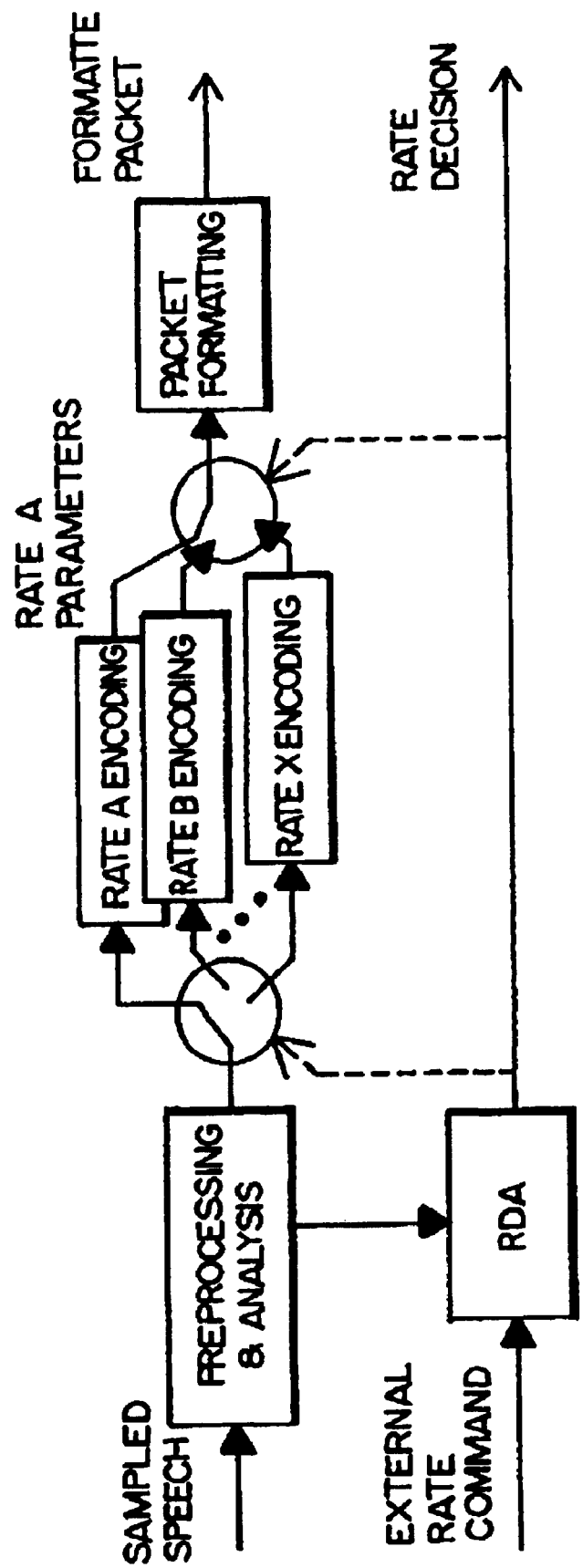
FIG. 3 is a top-level block diagram of a generic VRC example of the invention.

The generic VRC high-level speech encoder block diagram is shown in FIG. 3. As shown therein, the rate determination algorithm (RDA), based on speech content analysis and additional processing using external rate command (example channel conditions), produces a rate decision. The rate switches the proper encoding path, corresponding to the decided rate. The rate decision can be considered as part of encoded bit stream.

As examples of VRC, IS-127 (EVRC) and IS-733 (QCELP) codecs have three and four rates (respectively). The number of bits and rate options for these codecs are shown in Table 1.

TABLE 1

PACKET SIZES FOR IS-127 (EVRC) AND IS-733 (QCELP) VRCS

| Packet Type | IS-127: bits per packet (8.55, 4.0, –, and 0.8 kb/s) | IS-733: bits per packet (13.3, 6.2, 2.7, and 1.0 kb/s) |
|---|---|---|
| Rate 1 | 171 | 266 |
| Rate ½ | 80 | 124 |
| Rate ¼ | NA | 54 |
| Rate ⅛ | 16 | 20 |
| Blank | 0 | 0 |

The bit orders for these standards are from highest to lowest.

Extension of Profile Function to Support VRC

ITU and ATM Forum specifications (e.g. I.366.2 and AF-VOTA-0113.000) for AAL2 defines encoding format profiles to make reference to fixed rate audio encoding formats. A specific profile must be an agreed operating parameter between SSCS transmitter and receiver for both directions of an AAL2. A profile is used to indicate a predefined mapping for interpretation of audio packets. To utilize these widely accepted AAL2 mechanisms to our advantage, we extend the profile use for VRC (note that VRC is voice content VRC).

The pairs (UUI, Length) are domains of the above mapping. AAL2 standard reserves WUI (UUI stands for user-to-user indication) codepoint in the range between 0–15. The second element Length is to indicate the length of packet. AAL2 proposed concepts of subrange and modulus are efficient mechanisms that can be used. AAL2 audio profiles in simple cases are dedicated to a fixed codec type but in some cases encompass a number of codecs. VRC can use similar approach drawing parallel between alternative codec types in AAL2 profiles and subrates in a VRC.

AAL2 defines Service Data Unit (SDU) for audio in relation to profiles of the encoding audio formats, as the smallest packet length. Parameter M refers to multiple M of SDU, defined for any other entry in the profile for the same algorithm (M=1 for SDU itself).

New Profile Identifier and Profiles

The examples of VRC voice over ATM profiles herein use the above VRC algorithm examples. As these algorithms are non-ITU standard, we propose the addition of these profiles with identifiers to be assigned as part of reserved identifiers in Annex B for ATM Forum predefined profiles. Table 2 summarizes the VRC voice profile identifiers to be proposed as ATM Forum new identifiers. The profiles are given only as examples and obvious extensions are possible for any VRC audio stream which use UUI with appropriate codepoints and packet length pairs using type 1 packets.

TABLE 2

PROPOSED NEW IDENTIFIERS FOR ATM FORUM PREDEFINED PROFILES

| Identifier | Description of Profile | Reference |
|---|---|---|
| 6 | EVRC VRC Codec (IS-127) | Tables 3–8 |
| 7 | QCELP VRC Codec (IS-733) | Similar tables but tailored for IS-733 |
| 8 | SMV | Similar tables but tailored for SMV |

TABLE 3

EXAMPLE PROFILE FOR EVRC (IS-127

| UVI Code-point Range | Packet Length (octets) | Encoding Format | Description of Algorithm | M | Packet Time (ms) | Seq. No. Interval (ms) |
|---|---|---|---|---|---|---|
| 0–15 | 22 | Tables 4–8 | EVRC rate 1 | 1 | 20 | 20 |
| 0–15 | 10 | Tables 4–8 | EVRC rate ½ | 1 | 20 | 20 |
| 0–15 | 3 | Tables 4–8 | EVRC rate ⅛ | 1 | 20 | 20 |

Table 3 presents an example of AAL2 profile tailored for VRC (in this case EVRC). The value M=1 is used for all entries in the profile, as Service Data Unit (SDU or smallest packet length for algorithm) multiple M in this case is always one. Also note that subframe size in EVRC's 3 subframes varies (6.625, 6.625, and 6.75 ms) and we use the sequence number interval to be same as the frame size (20 ms).

Note that Table 3 is only one example of AAL2 profile to achieve VRC voice over ATM and obviously many variations are possible. As extensions of use of such profiles for QCELP or SMV are straight forward, we do not provide corresponding examples.

Mapping VRC Rate Decisions into AAL2 Profile Entries

As seen in Table 3, AAL2 profiles implicitly provide a mapping to indicate VRC active rate. Hence rate decision from the RDA (in this case EVRC) can be mapped into AAL2 profile entries for various rates. Reverse mapping on the receiver side is obviously possible. Once again similar mapping for any other VRC codec using the same idea (mapping each rate decision to a profile entry) is possible.

EDU Format Example for TIA/EIA/IS Standard

Tables 4–8 provide EDU (Encoding Data Unit) format for EVRC voice codec (TIA/EIA/IS-127), proposed as examples for VRC voice over ATM. Once again, this is an example and similar mapping for any other VRC codec such as QCELP or SMV is possible. They are extensions to the fixed rate algorithms defined in Annexes B through H of I.366.2 and the ones provided in Annex A in AF-VOTA-0113.000, to be proposed as additional ATM Forum predefined profiles. Similar to fixed rate algorithm cases, the encoding data unit format for each algorithm defines the mechanism for packing the encoder output bit stream into octets for transport in type 1 packets.

IS-127 EVRC speech codec algorithm is the second-generation wireless CDMA standard, primarily used in North America. The encoder, known as service option 3, conforms to general requirements for service option specified in IS-95. In Table 4, parts 1–6, providing EDU format for IS-127, the three middle columns correspond to the three possible rates with encoded parameter names and notation identical to EVRC document. For example LSPIDX(1)[0] is the Bit 0 for Line Spectrum Pair number 1. Another example is FCBSIDX for Fixed-Codebook-Shape-Index. By comparing the three columns, it is seen that parameter set and number of bits encoding each parameter varies across the three rates. The tables show how the first column codec bit index is mapped into the last column EDU Byte and bit.

TABLE 4

IS-127 RATE 1, RATE ½, AND RATE ⅛ EDU FORMATS

| Bit Index | Rate 1 Packet Bits | Rate ½ Packet Bits | Rate ⅛ Packet Bits | EDU Format Byte, Byte [bit] |
|---|---|---|---|---|
| 1 | LPCFLAG | LSPIDX (1) [0] | LSPIDX (1) [0] | 0 [0] |
| 2 | LSPIDX (1) [0] | LSPIDX (1) [1] | LSPIDX (1) [1] | 0 [1] |
| 3 | LSPIDX (1) [1] | LSPIDX (1) [2] | LSPIDX (1) [2] | 0 [2] |
| 4 | LSPIDX (1) [2] | LSPIDX (1) [3] | LSPIDX (1) [3] | 0 [3] |
| 5 | LSPIDX (1) [3] | LSPIDX (1) [4] | LSPIDX (2) [0] | 0 [4] |
| 6 | LSPIDX (1) [4] | LSPIDX (1) [5] | LSPIDX (2) [1] | 0 [5] |
| 7 | LSPIDX (1) [5] | LSPIDX (1) [6] | LSPIDX (2) [2] | 0 [6] |
| 8 | LSPIDX (2) [0] | LSPIDX (2) [0] | LSPIDX (2) [3] | 0 [7] |
| 9 | LSPIDX (2) [1] | LSPIDX (2) [1] | FGIDX [0] | 1 [0] |
| 10 | LSPIDX (2) [2] | LSPIDX (2) [2] | FGIDX [1] | 1 [1] |
| 11 | LSPIDX (2) [3] | LSPIDX (2) [3] | FGIDX [2] | 1 [2] |
| 12 | LSPIDX (2) [4] | LSPIDX (2) [4] | FGIDX [3] | 1 [3] |
| 13 | LSPIDX (2) [5] | LSPIDX (2) [5] | FGIDX [4] | 1 [4] |
| 14 | LSPIDX (2) [0] | LSPIDX (2) [6] | FGIDX [5] | 1 [5] |
| 15 | LSPIDX (3) [1] | LSPIDX (3) [0] | FGIDX [6] | 1 [6] |
| 16 | LSPIDX (3) [2] | LSPIDX (3) [1] | FGIDX [7] | 1 [7] |
| 17 | LSPIDX (3) [3] | LSPIDX (3) [2] | | 2 [0] |
| 18 | LSPIDX (3) [4] | LSPIDX (3) [3] | | 2 [1] |
| 19 | LSPIDX (3) [5] | LSPIDX (3) [4] | | 2 [2] |
| 20 | LSPIDX (3) [6] | LSPIDX (3) [5] | | 2 [3] |
| 21 | LSPIDX (3) [7] | LSPIDX (3) [6] | | 2 [4] |
| 22 | LSPIDX (3) [8] | LSPIDX (3) [7] | | 2 [5] |
| 23 | LSPIDX (4) [0] | DELAY [0] | | 2 [6] |
| 24 | LSPIDX (4) [1] | DELAY [1] | | 2 [7] |
| 25 | LSPIDX (4) [2] | DELAY [2] | | 3 [0] |
| 26 | LSPIDX (4) [3] | DELAY [3] | | 3 [1] |
| 27 | LSPIDX (4) [4] | DELAY [4] | | 3 [2] |
| 28 | LSPIDX (4) [5] | DELAY [5] | | 3 [3] |
| 29 | LSPIDX (4) [6] | DELAY [6] | | 3 [4] |
| 30 | DELAY [0] | ACBGIDX (0) [0] | | 3 [5] |
| 31 | DELAY [1] | ACBGIDX (0) [1] | | 3 [6] |
| 32 | DELAY [2] | ACBGIDX (0) [2] | | 3 [7] |
| 33 | DELAY [3] | FCBSIDX (0,0) [0] | | 4 [0] |
| 34 | DELAY [4] | FCBSIDX (0,0) [1] | | 4 [1] |
| 35 | DELAY [5] | FCBSIDX (0,0) [2] | | 4 [2] |
| 36 | DELAY [6] | FCBSIDX (0,0) [3] | | 4 [3] |
| 37 | DDELAY [0] | FCBSIDX (0,0) [4] | | 4 [4] |
| 38 | DDELAY [1] | FCBSIDX (0,0) [5] | | 4 [5] |
| 39 | DDELAY [2] | FCBSIDX (0,0) [6] | | 4 [6] |
| 40 | DDELAY [3] | FCBSIDX (0,0) [7] | | 4 [7] |
| 41 | DDELAY [4] | FCBSIDX (0,0) [8] | | 5 [0] |
| 42 | ACBGIDX (0) [0] | FCBSIDX (0,0) [9] | | 5 [1] |
| 43 | ACBGIDX (0) [1] | FCBGIDX (0) [0] | | 5 [2] |
| 44 | ACBGIDX (0) [2] | FCBGIDX (0) [1] | | 5 [3] |
| 45 | FCBSIDX (0,0) [0] | FCBGIDX (0) [2] | | 5 [4] |

TABLE 4-continued

IS-127 RATE 1, RATE ½, AND RATE ⅛ EDU FORMATS

| Bit Index | Rate 1 Packet Bits | Rate ½ Packet Bits | Rate ⅛ Packet Bits | EDU Format Byte, Byte [bit] |
|---|---|---|---|---|
| 46 | FCBSIDX (0,0) [1] | FCBGIDX (0) [3] | | 5 [5] |
| 47 | FCBSIDX (0,0) [2] | ACBGIDX (1) [0] | | 5 [6] |
| 48 | FCBSIDX (0,0) [3] | ACBGIDX (1) [1] | | 5 [7] |
| 49 | FCBSIDX (0,0) [4] | ACBGIDX (1) [2] | | 6 [0] |
| 50 | FCBSIDX (0,0) [5] | FCBSIDX (1,0) [0] | | 6 [1] |
| 51 | FCBSIDX (0,0) [6] | FCBSIDX (1,0) [1] | | 6 [2] |
| 52 | FCBSIDX (0,0) [7] | FCBSIDX (1,0) [2] | | 6 [3] |
| 53 | FCBSIDX (0,1) [0] | FCBSIDX (1,0) [3] | | 6 [4] |
| 54 | FCBSIDX (0,1) [1] | FCBSIDX (1,0) [4] | | 6 [5] |
| 55 | FCBSIDX (0,1) [2] | FCBSIDX (1,0) [5] | | 6 [6] |
| 56 | FCBSIDX (0,1) [3] | FCBSIDX (1,0) [6] | | 6 [7] |
| 57 | FCBSIDX (0,1) [4] | FCBSIDX (1,0) [7] | | 7 [0] |
| 58 | FCBSIDX (0,1) [5] | FCBSIDX (1,0) [8] | | 7 [1] |
| 59 | FCBSIDX (0,1) [6] | FCBSIDX (1,0) [9] | | 7 [2] |
| 60 | FCBSIDX (0,1) [7] | FCBGIDX (1) [0] | | 8 [3] |
| 61 | FCBSIDX (0,2) [0] | FCBGIDX (1) [1] | | 9 [4] |
| 62 | FCBSIDX (0,2) [1] | FCBGIDX (1) [2] | | 10 [5] |
| 63 | FCBSIDX (0,2) [2] | FCBGIDX (1) [3] | | 10 [6] |
| 64 | FCBSIDX (0,2) [3] | FCBGIDX (2) [0] | | 10 [7] |
| 65 | FCBSIDX (0,2) [4] | FCBGIDX (2) [1] | | 10 [0] |
| 66 | FCBSIDX (0,2) [5] | FCBGIDX (2) [2] | | 11 [1] |
| 67 | FCBSIDX (0,2) [6] | FCBSIDX (2,0) [0] | | 11 [2] |
| 68 | FCBSIDX (0,2) [7] | FCBSIDX (2,0) [1] | | 11 [3] |
| 69 | FCBSIDX (0,2) [0] | FCBSIDX (2,0) [2] | | 11 [4] |
| 70 | FCBSIDX (0,3) [1] | FCBSIDX (2,0) [3] | | 11 [5] |
| 71 | FCBSIDX (0,3) [2] | FCBSIDX (2,0) [4] | | 11 [6] |
| 72 | FCBSIDX (0,3) [3] | FCBSIDX (2,0) [5] | | 11 [7] |
| 73 | FCBSIDX (0,3) [4] | FCBSIDX (2,0) [6] | | 12 [0] |
| 74 | FCBSIDX (0,3) [5] | FCBSIDX (2,0) [7] | | 12 [1] |
| 75 | FCBSIDX (0,3) [6] | FCBSIDX (2,0) [8] | | 12 [2] |
| 76 | FCBSIDX (0,3) [7] | FCBSIDX (2,0) [9] | | 12 [3] |
| 77 | FCBSIDX (0,3) [8] | FCBSIDX (2) [0] | | 12 [4] |
| 78 | FCBSIDX (0,3) [9] | FCBSIDX (2) [1] | | 12 [5] |
| 79 | FCBSIDX (0,3) [10] | FCBSIDX (2) [2] | | 12 [6] |
| 80 | FCBSIDX (0) [0] | FCBSIDX (2) [3] | | 12 [7] |
| 81 | FCBSIDX (0) [1] | | | 13 [0] |
| 82 | FCBSIDX (0) [2] | | | 13 [1] |
| 83 | FCBSIDX (0) [3] | | | 13 [2] |
| 84 | FCBGIDX (0) [4] | | | 13 [3] |
| 85 | FCBGIDX (1) [0] | | | 13 [4] |
| 86 | FCBGIDX (1) [1] | | | 13 [5] |
| 87 | FCBGIDX (1) [2] | | | 13 [6] |
| 88 | FCBSIDX (1,0) [0] | | | 13 [7] |
| 89 | FCBGIDX (1,0) [1] | | | 14 [0] |
| 90 | FCBSIDX (1,0) [2] | | | 14 [1] |
| 91 | FCBSIDX (1,0) [3] | | | 14 [2] |
| 92 | FCBSIDX (1,0) [4] | | | 14 [3] |
| 93 | FCBSIDX (1,0) [5] | | | 14 [4] |
| 94 | FCBSIDX (1,0) [6] | | | 14 [5] |
| 95 | FCBSIDX (1,0) [7] | | | 14 [6] |
| 96 | FCBSIDX (1,1) [0] | | | 15 [7] |
| 97 | FCBSIDX (1,1) [1] | | | 16 [0] |
| 98 | FCBSIDX (1,1) [2] | | | 16 [1] |
| 99 | FCBSIDX (1,1) [3] | | | 16 [2] |
| 100 | FCBSIDX (1,1) [4] | | | 16 [3] |
| 101 | FCBSIDX (1,1) [5] | | | 16 [4] |
| 102 | FCBSIDX (1,1) [6] | | | 16 [5] |
| 103 | FCBSIDX (1,1) [7] | | | 16 [6] |
| 104 | FCBSIDX (1,2) [0] | | | 16 [7] |
| 105 | FCBSIDX (1,2) [1] | | | 17 [0] |
| 106 | FCBSIDX (1,2) [2] | | | 17 [1] |
| 107 | FCBSIDX (1,2) [3] | | | 17 [2] |
| 108 | FCBSIDX (1,2) [4] | | | 17 [3] |
| 109 | FCBSIDX (1,2) [5] | | | 17 [4] |
| 110 | FCBSIDX (1,2) [6] | | | 17 [5] |
| 111 | FCBSIDX (1,2) [7] | | | 17 [6] |
| 112 | FCBSIDX (1,3) [0] | | | 17 [7] |
| 113 | FCBSIDX (1,3) [1] | | | 18 [0] |
| 114 | FCBSIDX (1,3) [2] | | | 18 [1] |
| 115 | FCBSIDX (1,3) [3] | | | 18 [2] |
| 116 | FCBSIDX (1,3) [4] | | | 18 [3] |

TABLE 4-continued

IS-127 RATE 1, RATE ½, AND RATE ⅛ EDU FORMATS

| Bit Index | Rate 1 Packet Bits | Rate ½ Packet Bits | Rate ⅛ Packet Bits | EDU Format Byte, Byte [bit] |
|---|---|---|---|---|
| 117 | FCBSIDX (1,3) [5] | | | 18 [4] |
| 118 | FCBSIDX (1,3) [6] | | | 18 [5] |
| 119 | FCBSIDX (1,3) [7] | | | 18 [6] |
| 120 | FCBSIDX (1,3) [8] | | | 18 [7] |
| 121 | FCBSIDX (1,3) [9] | | | 19 [0] |
| 122 | FCBSIDX (1,3) [10] | | | 19 [1] |
| 123 | FCBGIDX (1) [0] | | | 19 [2] |
| 124 | FCBGIDX (1) [1] | | | 19 [3] |
| 125 | FCBGIDX (1) [2] | | | 19 [4] |
| 126 | FCBGIDX (1) [3] | | | 19 [5] |
| 127 | FCBGIDX (1) [4] | | | 19 [6] |
| 128 | FCBGIDX (2) [0] | | | 19 [7] |
| 129 | FCBGIDX (2) [1] | | | 20 [0] |
| 130 | FCBGIDX (2) [2] | | | 20 [1] |
| 131 | FCBSIDX (2,0) [0] | | | 20 [2] |
| 132 | FCBGIDX (2,0) [1] | | | 20 [3] |
| 133 | FCBSIDX (2,0) [2] | | | 20 [4] |
| 134 | FCBSIDX (2,0) [3] | | | 20 [5] |
| 135 | FCBSIDX (2,0) [4] | | | 20 [6] |
| 136 | FCBSIDX (2,0) [5] | | | 20 [7] |
| 137 | FCBSIDX (2,0) [6] | | | 21 [0] |
| 138 | FCBSIDX (2,0) [7] | | | 21 [1] |
| 139 | FCBSIDX (2,1) [0] | | | 21 [2] |
| 140 | FCBSIDX (2,1) [1] | | | 21 [3] |
| 141 | FCBSIDX (2,1) [2] | | | 21 [4] |
| 142 | FCBSIDX (2,1) [3] | | | 21 [5] |
| 143 | FCBSIDX (2,1) [4] | | | 21 [6] |
| 144 | FCBSIDX (2,1) [5] | | | 21 [7] |
| 145 | FCBSIDX (2,1) [6] | | | 22 [0] |
| 146 | FCBSIDX (2,1) [7] | | | 21 [1] |
| 147 | FCBSIDX (2,2) [0] | | | 21 [2] |
| 148 | FCBSIDX (2,2) [1] | | | 22 [3] |
| 149 | FCBSIDX (2,2) [2] | | | 22 [4] |
| 150 | FCBSIDX (2,2) [3] | | | 22 [5] |
| 151 | FCBSIDX (2,2) [4] | | | 22 [6] |
| 152 | FCBSIDX (2,2) [5] | | | 22 [7] |
| 153 | FCBSIDX (2,2) [6] | | | 23 [0] |
| 154 | FCBSIDX (2,2) [7] | | | 23 [1] |
| 155 | FCBSIDX (2,3) [0] | | | 23 [2] |
| 156 | FCBSIDX (2,3) [1] | | | 23 [3] |
| 157 | FCBSIDX (2,3) [2] | | | 23 [4] |
| 158 | FCBSIDX (2,3) [3] | | | 23 [5] |
| 159 | FCBSIDX (2,3) [4] | | | 23 [6] |
| 160 | FCBSIDX (2,3) [5] | | | 23 [7] |
| 161 | FCBSIDX (2,3) [6] | | | 24 [0] |
| 162 | FCBSIDX (2,3) [7] | | | 24 [1] |
| 163 | FCBSIDX (2,3) [8] | | | 24 [2] |
| 164 | FCBSIDX (2,3) [9] | | | 24 [3] |
| 165 | FCBSIDX (2,3) [10] | | | 24 [4] |
| 166 | FCBGIDX (2) [0] | | | 24 [5] |
| 167 | FCBGIDX (2) [1] | | | 24 [6] |
| 168 | FCBGIDX (2) [2] | | | 24 [7] |
| 169 | FCBGIDX (2) [3] | | | 25 [0] |
| 170 | FCBGIDX (2) [4] | | | 25 [1] |
| 171 | (reserved) | | | 25 [2] |

Sequence Numbering, Error Detection and Concealment Mechanism

AAL2 defines a sequence number for each packet that is incremented by some integral value from the preceding packet, according to the sequence number interval set by the profile entry. The Sequence number in Table 3 follows this method. In this case embedded sequence numbers within UUI, take the simple approach of using the entire 0–15 range for sequence numbers modulo 16.

As AAL2 makes it mandatory to increment the sequence numbers at the transmitter, the receiver can use sequence number for error detection. EVRC and QCELP use frame number and frame loss indication as part of mechanism to combat channel impairments inherent to a wireless environment. The objective here is to provide a scheme, which allows error detection across end-to-end proposed VRC-ATM and does not prevent the utilization of error detection and concealment techniques already available in codecs such as EVRC. EVRC a Frame number-to-ATM Sequence number mapping will achieve this objective.

AAL2 Sequence Number-Codec Frame Number Mapping

EVRC and QCELP both supporting the notion of frame erasure, can be fed by the frame loss/error information deducted from sequence number. A preprocessing block, mapping two similar notions, can achieve this. Note that frame error in the wireless application may occur prior to ATM access and can be conveyed by the same mechanism.

Taking Advantage of Existing Error Concealment Mechanisms

As Frame number and sequence number can be tracked along the voice transport path, frame loss can be detected. In addition, good/bad frame indication can also be transmitted as part of transmitted bit stream and this integrity of this information can be maintained. Consequently, error concealment mechanisms developed for wireless or other environments are readily useable in the proposed VRC voice over ATM. Examples of current and new techniques under study (e.g. see some recent techniques part of GSM adaptive multi-rate candidate codecs) (GSM=Global System For Mobile Communications) are:

Line spectral Pair (LSP) interpolation

Decaying gain value (FCBG and ACBG in tables 4–8)

Repetition and interpolation of parameters with long term averaging and other ※ art-of-speech ※ techniques TFO of VRC Over ATM Advantage One advantage of the proposed scheme of VRC AAL2 speech coding is the possibility of TFO for cases where VRC at both ends of transmission link are used. For example, if a wireless system using VRC is using the ATM AAL2 transport mechanism, normally PCM transcoding is unavoidable because prior use of AAL2 will not support VRC per se. Using the proposed scheme, such PCM-VRC transcoding can be avoided and hence speech quality degradation due to such repeated encode-decode operation will not happen.

Multi-channel VRC Over ATM Advantage

Voice transport using AAL2 in multi-channel environment, using multiplexed via a single ATM virtual circuit has known advantages. The advantages due to more efficient use of channel during silence periods of comprised channels are further enhanced when the proposed VRC over ATM is utilized. On average bandwidth utilization is reduced as a consequence to lower average rate for plurality of involved channels as each channel average rate is further reduced using VRC in comparison with SS use alone.

Although the present invention has been shown and described with respect to preferred embodiments, various changes and modifications lie within the spirit and scope of the claimed invention. Thus, the corresponding structures, materials, acts, and equivalents of all means or step plus function elements in the claims are intended to include any structure, material, or acts for performing the functions in combination with other elements as specifically claimed. Having thus disclosed preferred embodiments of the invention, it being understood that various modifications and additions are contemplated and will be apparent to those having the benefit of this disclosure,

What is claimed is:

1. A method for efficiently transporting speech and audio data packets over digital packet networks; the method comprising the steps of:

analyzing and processing speech and audio content;

generating a rate determination algorithm based upon said analysis and processing, said algorithm producing a rate decision output for switching an appropriate encoding path;

producing encoded variable bit stream packets from said speech and audio content and said rate decision output for asynchronous transmission mode (ATM) operation using an ATM adaptation layer of type 2 (AAL2) environment;

recognizing the encoded variable bit packets;

disassembling said packets and reproducing bit steams and rate decision outputs therefrom; and decoding said speech and audio content using an algorithm which is the inverse of said rate determination algorithm.

2. The method recited in claim 1 further comprising the step of employing tandem free operation.

3. The method recited in claim 1 further comprising the step of mapping frame numbers into AAL2 sequence numbers corresponding to said encoded variable bit stream packets.

4. The method recited in claim 3 further comprising the steps of detecting frame errors in said encoded variable bit stream packets and concealing said frame errors.

5. The method recited in claim 3 wherein said mapping step is carried out using user-to-user indication and length of packet.

6. The method recited in claim 1 wherein said steps are carried out in a circuit emulation service (CES) application involving at least one of ATM transport, trunking, and access.

7. The method recited in claim 1 wherein said steps are carried out in a local loop emulation service (LLES) application involving at least one of ATM transport, trunking, and access.

8. A system for efficiently transporting speech and audio data packets over digital packet networks; the system comprising:

a speech and audio content analyzer and processor;

an algorithm for generating a rate decision output based upon said analyzed and processed speech and audio content;

a plurality of encoding paths controlled by a switch dependent upon said rate decision output;

a packet formatter producing encoded variable bit stream packets from said speech and audio content, said packets and said rate decision output being transmitted by asynchronous transmission mode (ATM) operation using an ATM adaptation layer of type 2 (AAL2) environment;

a receiver recognizing the encoded variable bit stream packets and having means for disassembling said packets and reproducing said bit streams and rate decision outputs therefrom; and a decoder for decoding said speech and audio content using an algorithm which is the inverse of said rate decision output algorithm.

9. The system recited in claim 8 further comprising means for tandem free operation.

10. The system recited in claim 8 further comprising means for mapping frame numbers into AAL2 sequence numbers corresponding to said variable bit stream packets.

11. The system recited in claim 10 further comprising means for detecting frame errors in said encoded variable bit stream packets and for concealing said frame errors.

12. The system recited in claim 10 wherein said means for mapping employs the parameters of user-to-user indication and length of packet.

* * * * *